United States Patent
Garavelli

[15] 3,660,988
[45] May 9, 1972

[54] CONTAINER FOR COMBINING GAS WITH A LIQUID MIXTURE AND FOR CONVEYING THE MIXTURE THEREBY OBTAINED TO A MACHINE, PARTICULARLY FOR USE IN ICE CREAM MAKING MACHINES

[72] Inventor: Giancarlo Garavelli, Milan, Italy
[73] Assignee: Heron Establishment, Vaduz, Liechtenstein
[22] Filed: Sept. 22, 1969
[21] Appl. No.: 859,749

[30] Foreign Application Priority Data
Sept. 24, 1968 Italy..................................39973 A/68

[52] U.S. Cl....................................62/306, 62/69, 261/77
[51] Int. Cl..........................................................F25c 7/14
[58] Field of Search........................62/69, 70, 309; 239/343; 261/DIG. 7, 77, DIG. 16

[56] References Cited
UNITED STATES PATENTS

| | | | |
|---|---|---|---|
| 2,861,433 | 11/1958 | Booth | 62/306 X |
| 3,044,878 | 7/1962 | Knedlik | 62/306 X |
| 3,222,035 | 12/1965 | Lutz et al. | 62/342 X |
| 3,256,100 | 6/1966 | Bernstein et al. | 62/342 X |
| 2,680,010 | 6/1954 | Dubay | 239/343 X |
| 3,190,082 | 6/1965 | Duke | 62/69 X |
| 3,209,554 | 10/1965 | MacManus | 62/306 |
| 3,403,523 | 10/1968 | Bauer et al. | 62/70 |

Primary Examiner—William E. Wayner
Attorney—Kimmel, Crowell & Weaver

[57] ABSTRACT

An ice cream making machine and a combined conveying and mixing apparatus are disclosed. The conveying and mixing apparatus provide the pressure for feeding the ice cream mix from its container to the ice cream making machine while simultaneously incorporating a predetermined specific gas ratio into the mix so as to produce the desired gas mix ratio in a complete ice cream.

2 Claims, 2 Drawing Figures

CONTAINER FOR COMBINING GAS WITH A LIQUID MIXTURE AND FOR CONVEYING THE MIXTURE THEREBY OBTAINED TO A MACHINE, PARTICULARLY FOR USE IN ICE CREAM MAKING MACHINES

BACKGROUND OF THE INVENTION

1. Field of the Invention

The invention relates to the continuous production of ice cream of the type generally known as soft ice cream wherein a continuous ice cream freezer is continuously fed with a mixture of ice cream forming solids and a gas distributed therethrough to produce a soft finished ice cream.

2. Description of the Prior Art

In prior art machines a liquid mixture is contained in an independent air-tight container connected to a cylinder of compressed gas, the compressed gas having the twofold function of creating the gas-liquid emulsion, by means of pressure alone, and of conveying the emulsion thereby obtained to the machine. The emulsion leaves the container through an exit tube which penetrates to the bottom of the container.

The containers used in machines of this type are inconvenient in that the only way of varying the gas-liquid ratio in the emulsion is to vary the pressure at which the gas is introduced into the container. This results in an opposition between the two values that the gas has to obtain, namely, the optimum value for the conveyance of the emulsion to the machine by means of pressure, and the value of the pressure required to obtain the correct gas-liquid ratio in the final emulsion.

SUMMARY OF THE INVENTION

In the present invention the mix is contained in a gas-tight container and gas is used to force the mix therefrom to the ice cream freezer. The mix as it leaves the container passes into a small mixing chamber where it is emulsified with gas in a predetermined ratio and the emulsified material is fed onto the ice cream freezer by the gas pressure on the surface of the mix.

Figure 1:
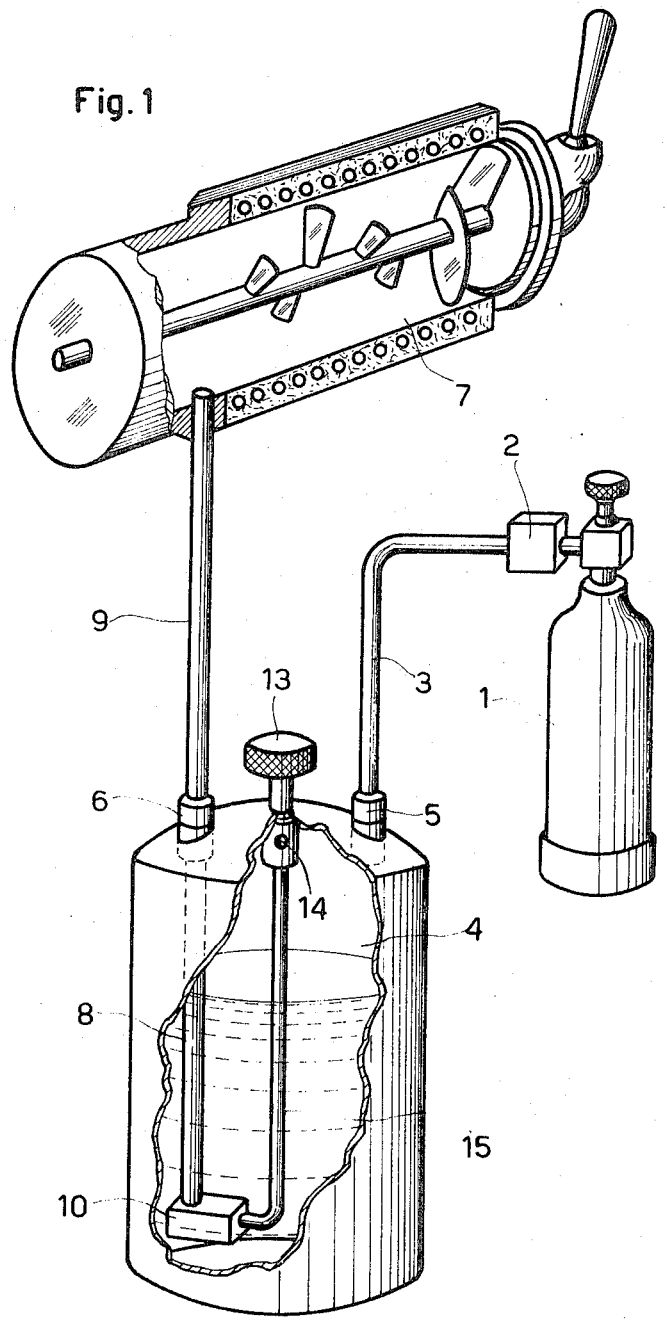
FIG. 1 is a side elevation of the invention shown partially broken away and in section and with parts in perspective for convenience of illustration.
Figure 2:
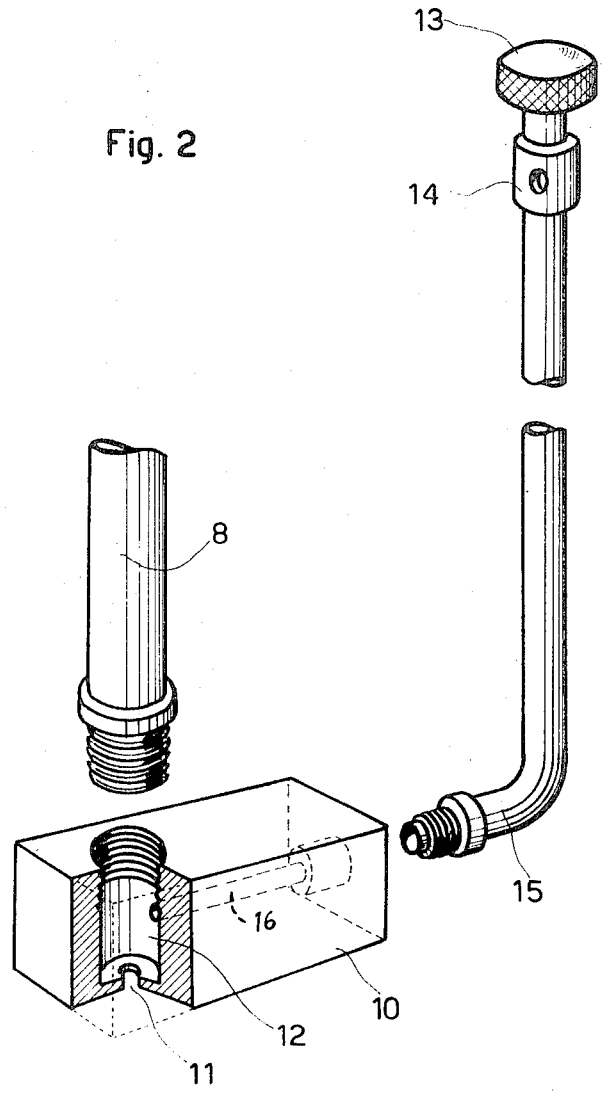
FIG. 2 is a fragmentary perspective view of the emulsifying mixing chamber shown partly broken away and in section for convenience of illustration.

Referring now to the drawings in detail wherein like reference characters indicate like parts throughout the several Figures, we find in FIG. 1 the complete system according to the present invention. The system of FIG. 1 includes a cylinder of compressed gas 1 having a conventional reducing valve 2 connected thereto and having a pipe 3 extending therefrom to a pressure mix supply container 4. The pipe 3 extends through a valved connection 5 such that the pressure on the pipe 3 and in the container 4 are maintained when the connection 5 is disconnected.

An ice cream freezer 7 of conventional design has a pipe 9 extending toward the container 4 and is connected to the container 4 through a valve connection 6 identical to the valve connection 5. An exit tube 8 is positioned within the container 4 and is connected to the valve connection 6 as can be seen in FIG. 1. The exit tube 8 extends almost to the bottom of the container 4 and has a block 10 threaded onto the lower end thereof. The block 10 has a mixing chamber 12 therein communicating with the exit tube 8 and having an orifice 11 opening through the bottom thereof into the mixing chamber 12 to permit the flow of fluid from the container 4 into the mixing chamber 12. The tube 15 extends from the top of the container 4 to one end of the block 10 to which it is detachably secured and communicates with the mixing chamber 12 through a bore 16. The upper end of the tube 15 has a port 14 opening into the container 4 above the fluids contained therein with the orifice 14 being adjustable by means of a knob 13 which extends outside of the container 4 to permit the flow of gas from the container 4 into the mixing chamber 12 to be controlled.

In the use and operation of the invention the container 4 is partially filled with an ice cream mix and gas from the cylinder 1 is admitted to the container 4 to provide pressure for moving the ice cream mix to the ice cream freezer 7. By opening the orifice 14 a desired amount with the knob 13, gas from the container 4 can be admitted to the mixing chamber 12 so as to emulsify with the ice cream mix therein and pass upwardly through the tube 8 and tube 9 to the ice cream freezer 7. The quantity of gas emulsifying with the ice cream mix in the mixing chamber 12 can be minutely controlled by varying the opening of the orifice 14 with the knob 13.

Having thus described the preferred embodiment of the invention, it should be understood that numerous structural modifications and adaptations may be resorted to without departing from the spirit of the invention.

What is claimed is:

1. In combination with an ice cream freezer an apparatus for producing a gas-liquid emulsion and for conveying said emulsion to said ice cream freezer, said apparatus comprising the combination of: a sealed container having a quantity of liquid ice cream mix therein; a pipe in communication with the upper part of said sealed container above the top of the liquid for supplying gas under pressure to said sealed container; a mixing block positioned within said container and adjacent the bottom thereof below the top of the liquid, said mixing block having a mixing chamber therein and an opening communicating with said sealed container below the top of the liquid to admit liquid from the container into said mixing chamber; a first tube extending upwardly of the mixing chamber above the top of the liquid for conducting gas from the upper portion of said sealed container above the top of the liquid to said mixing chamber; means connected to said first tube for controlling and varying the flow of said gas to said mixing chamber; a second tube connected to, and in communication with, said mixing chamber and extending outwardly of the container for conveying the emulsion formed within said chamber from said chamber; and means detachably secured to said second tube and extending to the freezer for conveying said emulsion to the ice cream freezer.

2. The apparatus as defined in claim 1 wherein the means for controlling the flow of gas includes an aperture in the second tube and hand controlled means for varying the size of said aperture.

* * * * *